Aug. 27, 1963 H. R. LANGE 3,101,534
METHOD OF PRODUCING WRIST PINS OR SIMILAR ARTICLES
Filed June 30, 1958 2 Sheets-Sheet 1

INVENTOR
Harry R. Lange
BY
ATTORNEYS

Aug. 27, 1963     H. R. LANGE     3,101,534
METHOD OF PRODUCING WRIST PINS OR SIMILAR ARTICLES
Filed June 30, 1958     2 Sheets-Sheet 2
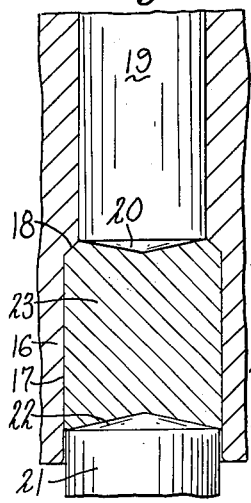
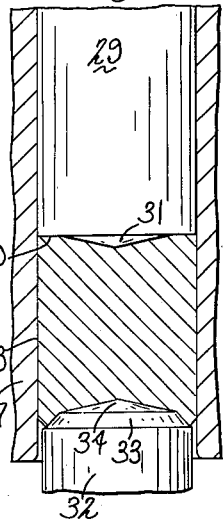
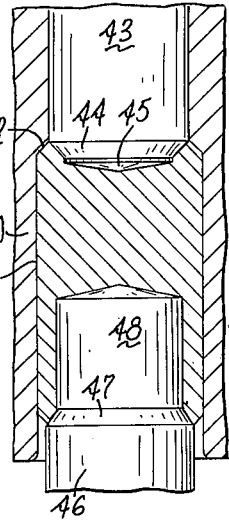
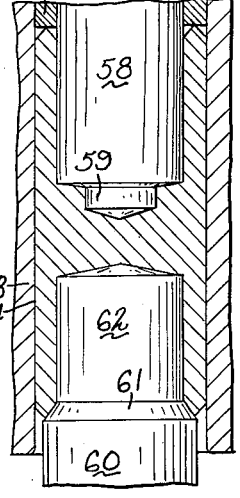
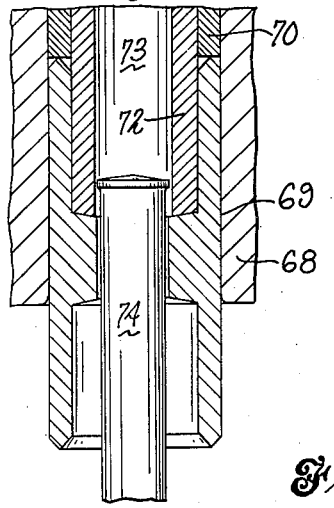
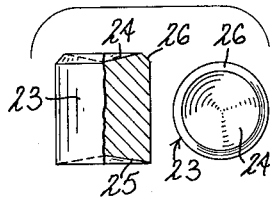
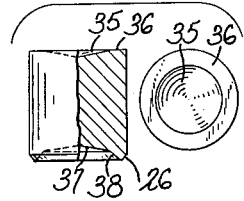
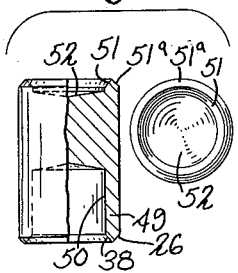
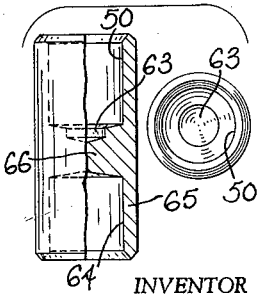
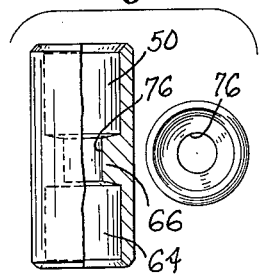

United States Patent Office 3,101,534
Patented Aug. 27, 1963

3,101,534
METHOD OF PRODUCING WRIST PINS OR SIMILAR ARTICLES
Harry R. Lange, Waterbury, Conn., assignor, by mesne assignments, to Textron Inc., Providence, R.I., a corporation of Rhode Island
Filed June 30, 1958, Ser. No. 745,549
6 Claims. (Cl. 29—553)

This invention relates to a method of producing wrist pins or similar articles and more particularly to a metal article of cylindrical shape having relatively deep openings extending thereinto from each end face, the two openings being separated by a web which in turn is pierced to provide an opening therethrough. The method illustrated is particularly adapted to form such an article by a series of steps in a progressive header or like machine wherein a plurality of dies are provided in a die bed and the reciprocating gate carries a plurality of punches, one to cooperate with each of the dies, the workpiece being cut from a piece of solid stock and transferred from one die to the next during the operation of the machine.

The finished wrist pin is not only provided with the intermediate pierced web separating the openings extending into the body of the article from each end face thereof, but also the end edges are desirably provided with internal and external chamfered surfaces which are formed in the earlier or intermediate steps in the manufacture of the device and thereafter preserved during subsequent operations.

In the process of forming the finished article, the openings or holes formed in the workpiece are made by extruding the metal of the workpiece rearwardly over a punch carried by the reciprocating gate. As it is desirable to form such openings at the punch face of the blank, the latter is revolved during its transfer from one working station to the next when the second opening is formed and may also be revolved during transfer between certain other stations where this is found desirable.

One object of the invention is to provide a new and improved method of forming a cylindrical article having relatively deep openings extending thereinto from each end face thereof, the openings being separated by an intermediate pierced web.

A still further object of the invention is to provide a novel method of producing an article of the character described wherein the end edges of the completed article will be provided with internal and external chamfers where required.

Still another object of the invention is to provide a novel method of making a wrist pin or similar article by a series of steps or operations performed progressively upon a workpiece at a number of different working stations in a header or like machine, the workpiece being transferred from one working station to the next to be delivered from the machine in finished condition.

To these and other ends the invention consists in the novel features and combinations of parts to be hereinafter described and claimed.

In the accompanying drawings:

FIG. 2 is an enlarged sectional view showing the operation at the first working station of the machine;

FIGS. 3, 4, 5 and 6 are views similar to FIG. 2, showing the cooperating tools, and the operations performed, at the second, third, fourth and fifth stations of the machine;

FIG. 7 illustrates in an elevational view, partly in section, and top plan view the shape of the workpiece as formed in the first station; and FIGS. 8, 9, 10 and 11 are similar views of the workpiece formed at stations Nos. 2, 3, 4 and 5.

Figure 1:
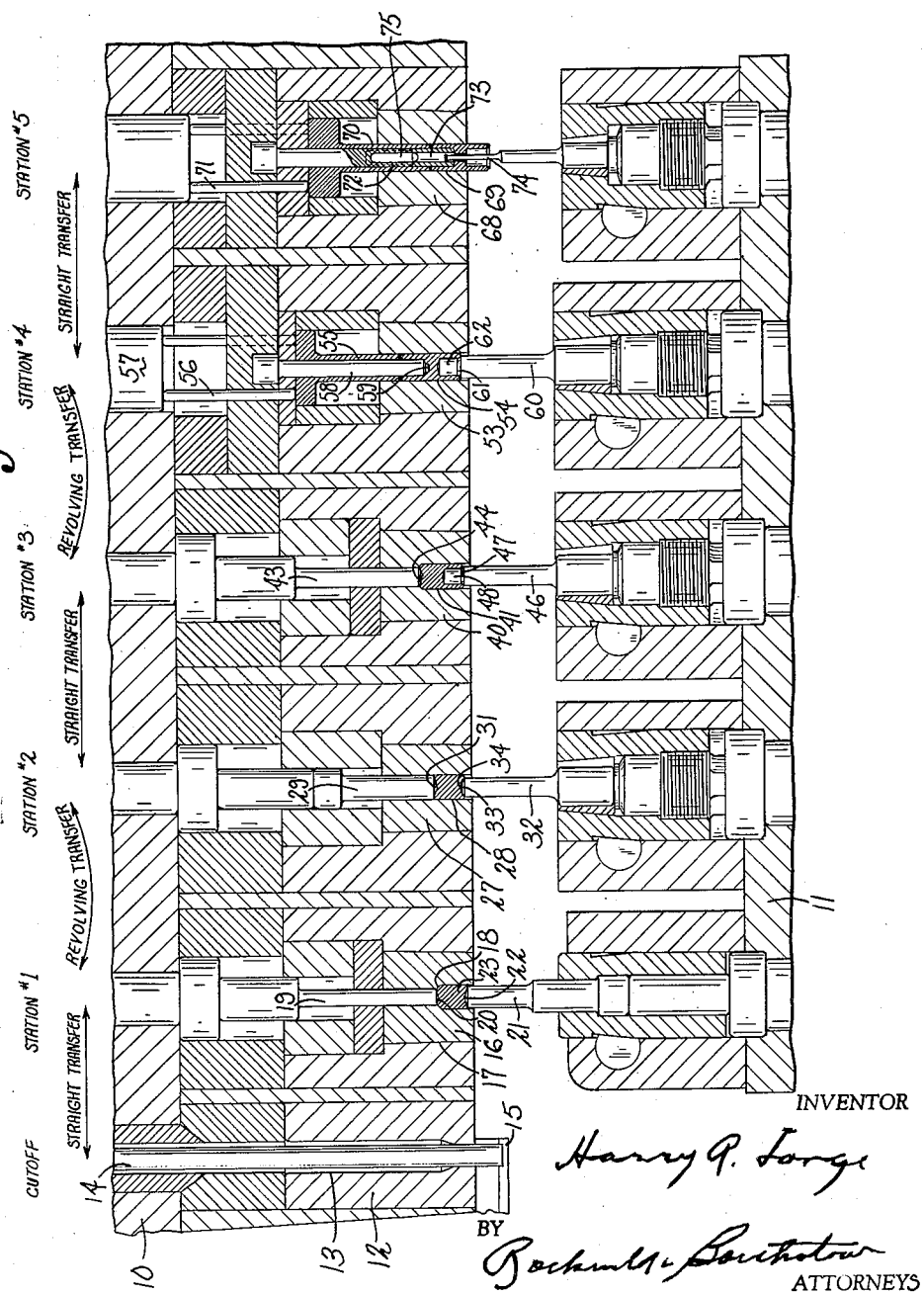
FIG. 1 is a sectional view of the working dies and punches of a progressive header or like machine employed to perform the novel method.

To illustrate a preferred embodiment of my invention, I have shown in FIG. 1 of the drawings a progressive header or parts-forming machine having a die bed 10 having a plurality of dies therein as will be described more particularly hereinafter, and a gate 11 carrying a plurality of punches, each to cooperate with one of the dies of the die bed. It will be understood that as is usual the die bed will be fixed in position while means is provided to reciprocate the gate to move the punches toward and away from the dies. Also means will be provided (not shown) to transfer the workpieces or blanks from one station to another. As the particular means for reciprocating the gate and also for transferring the workpieces or blanks is well known, illustration thereof is not necessary herein.

The die bed may be provided with a cut-off die 12 having an opening 13 therein through which a length of metal stock 14 may be fed in a step-by-step manner so that an end thereof will project from the outerface of the die 12. This projecting end may be severed by a knife or severing member shown diagrammatically at 15 and by the knife transferred to the first working station of the machine.

At this first working station a die 16 is provided in the die bed, this die being provided with a cylindrical opening 17 (FIG. 2), the opening being provided adjacent its rear end with an inwardly tapered portion 18 to provide an annular chamfer upon the workpiece as will be hereinafter explained. Beyond the tapering shoulder 18 the die opening may be filled by a knock-out pin 19 having a conical end face 20 to slightly indent the inner face of the blank. The gate is provided with a punch 21 having a conical end 22 to form a conical indent in the outer or punch face of the blank.

When the workpiece cut from the length of stock 13 is transferred to a position opposite the opening 17 of the die 16 and the gate advancing toward the die, the punch 21 drives the workpiece into the die opening and, by pressure between the punch 21 and knock-out pin 19, the workpiece is formed into the shape shown in FIG. 7. Here the workpiece designated by the numeral 23 is provided with a conical indented edge face as indicated at 24 and 25, and at the die face of the blank an annular peripheral chamfer 26 is formed by the tapered shoulder 18 of the die.

The workpiece may then be transferred to the second working station of the machine, and during such transfer is revolved or turned end for end so that the die face of the workpiece at station No. 1 becomes the punch face at station No. 2. This will relieve pressure upon the chamfered portion of the workpiece and preserve this portion as originally formed. At this second station a die 27 is provided in the die bed, which die, as shown in FIG. 3, is provided with a cylindrical opening 28. A knock-out pin 29 closes the rear end of this opening, this knock-out pin being provided with a flat annular surface 30 adjacent its periphery and a conical tip 31 within said annular surface.

At this station the gate is provided with a punch 32 which, as shown in FIG. 3, is provided with an annular tapered surface 33 and a tip 34 of conical shape. Upon advance of the punch 32, the workpiece is driven into the die opening 28 and, by cooperation of the knock-out pin 29 and punch 32, is formed as shown in FIG. 8. From this figure it will be seen that the blank is provided at the die face with a conical indent 35 surrounded by a relatively flat annular surface 36. At the punch face the blank is indented more deeply, as shown at 37, so as to provide locating means to guide the punch in the next succeeding operation. It is also provided with an internal chamfer 38 formed by the tapered surface 33 of the punch 32, and it will be noted that the external chamfer 26 previously formed at the die face of the blank at station No. 1 is preserved at this station.

At the third working station of the machine the die bed is provided with a die 40 having an opening 41 therein, as shown in FIG. 4. This opening is also provided with a tapered shoulder 42 similar to the shoulder 18 of the die 16 and a knock-out punch 43 closes the rear end of the opening 41 adjacent this shoulder. This punch is also provided with an annular tapered portion 44 to form an internal chamfer on the blank and an end or nose portion 45 to indent the blank within this chamfered portion and provide a guide or locating means for an indenting punch to be employed at the succeeding station.

At the third station the gate is provided with a punch 46 having an annular tapered shoulder 47 and outwardly of this shoulder a reduced cylindrical portion 48 to form an opening in the blank and extrude the metal thereof rearwardly or in a direction opposite that of the movement of the punch around the portion 48.

When the blank shaped as shown in FIG. 8 is transferred to the third station, it is not revolved and the punch face at the second station remains as the punch face at station No. 3. When the gate is advanced, the punch 46 drives the blank into the die 40 and the extruding portion 48 of the punch guided by the opening 37 is forced into the metal of the blank, extruding it rearwardly around the punch so as to form an annular skirt portion 49, as shown in FIG. 9. It will also be apparent that the shoulder 47 on the punch preserves the internal chamfer 38 and the external chamfer 26 is not affected. A relatively deep opening 50 is formed in the blank within the skirt portion 49. At the other end of the blank an internal chamfer 51 is formed by the annular tapered surface 44 of the knock-out pin 43 and also this face of the blank is indented, as shown at 52, this indentation being made to serve as a guide for the extruding punch at the next station, the blank being rotated or turned end for end between stations 3 and 4. Also the tapered shoulder 42 on the die forms an exterior chamfer 51ᵃ at the die end of the blank so that, after the operation at this station, the blank is provided with internal and external chamfers at both ends.

At station No. 4 a die 53 is provided in the die bed, this die being provided with an opening 54. Within the rear end of the opening is received a knock-out sleeve 55 (FIGS. 1 and 5) which may be actuated by the knock-out pins 56 and ejecting punch 57. Mounted within this sleeve and extending into the die opening is a forming punch 58 provided with a cylindrical nose portion 59 designed to indent the metal of the blank as will be explained hereinafter. The body of this forming punch is of substantially the same size as the opening 50 formed in the blank at the third station so that the extruded portion of the blank as delivered from the station will be located over the punch 58 and the dimensions of this end of the blank will be maintained at this station, as shown in FIG. 5. The gate at the fourth station is provided with a punch 60, this punch being provided with a tapered shoulder 61 and a reduced end portion 62 forwardly of the taper, the parts 61 and 62 being similar to the parts 47 and 48 of the punch 46.

When the blank formed as shown in FIGS. 4 and 9 is transferred to the fourth station, it is reversed or turned end for end so that the opening 50 will be received over the punch 58 when the blank is forced into the die by the advance of the gate and punch 60. As shown in FIG. 5, the nose portion 59 will indent the metal at the bottom of the opening 50, as shown at 63 (FIGS. 5 and 10). Also the end 62 of the punch 60 will be forced into the metal of the blank and an opening 64 formed in the punch end of the blank by backward extrusion over the punch, thus forming the cylindrical skirt portion 65.

At this station the forming punch 58 of the die supports the blank against the force exerted by the punch 60 so that the internal and external chamfers at both ends of the blank are preserved, the sleeve 55 acting to eject the blank from the die after the operation has been performed.

The blank after the operation at station No. 4 is of the form shown in FIG. 10 wherein the openings 50 and 64 are separated by an intermediate or central web 66 in the rear face of which the indented hole 63 has been formed to provide for the piercing of an opening through this web at the next station. The shoulder 61 on the punch 60 engages and preserves the chamfer 51 formed at the previous station.

At the fifth or piercing station a die 68 is provided in the die bed, this die being provided with an opening 69 in which extends a knock-out sleeve 70 actuated by the knock-out pins 71. Mounted within the sleeve 70 is an inner sleeve member 72 having an opening 73 to receive a piercing punch 74 carried by the gate 11. This sleeve and also the sleeve 70 may be provided with registering openings 75 to permit the slugs punched from the central web 66 of the blank to drop from the machine.

As shown in FIG. 6, when the blank is transferred to the piercing station and driven therein by advance of the gate and piercing punch 74, the inner face of the web 66 bottoms against the outer end of the sleeve 72, this sleeve fitting snugly within the opening 50. Upon further advance of the gate, the piercing punch pierces an opening 76 through the web 66, the indented hole 63 assisting in permitting the pierced slug to break away from the surrounding metal. After this operation, the ejecting sleeve 70 may be advanced to eject the blank from the die.

The completed blank delivered from the fifth or piercing station is shown in FIG. 11 where, as will be noted, the finished workpiece is of substantially the same form as shown in FIG. 10 except that the opening 76 has been pierced through the web 66. The chamfered surfaces, both internal and external, are preserved at the ends of the blank and the openings 50 and 64 extending from the outer faces to the web 66 have been preserved and are of the same dimensions as shown in FIG. 10.

While I have shown and described a preferred method of carrying out my improved process, it will be understood that it is not limited to all of the details shown, but is capable of modification and variation within the spirit of the invention and within the scope of the appended claims.

What I claim is:

1. The method of making a hollow cylindrical metal article which comprises cutting a workpiece from a length of metal stock, forming a peripheral chamfer at one end of the workpiece and an indentation in said end within the chamfer, then, by the action of a cooperating fixed die and movable punch, applying pressure to both ends of the workpiece while the latter is wholly confined within a die to form a relatively deep cylindrical opening in said indented face by extruding the metal of the workpiece around the punch in a direction toward the open end of the die and opposite that of the movement of the punch, and then turning the workpiece end for end and, by the action of a second die and movable punch, again extruding the metal of the workpiece around a moving punch in a direction toward the die opening and opposite that of the movement of the punch to form a deep opening in the other face of the workpiece, leaving a relatively thin web of material between the bottoms of said openings, and simultaneously indenting the central portion of the face of the web at the bottom of the first formed opening.

2. The method of making a hollow cylindrical metal article which comprises cutting a workpiece from a length of metal stock, forming a peripheral chamfer at one end of the workpiece and an indentation in said end within the chamfer, and then, by the action of a cooperating fixed die and movable punch, applying pressure to both ends of the workpiece while the latter is wholly confined within a die to form a relatively deep cylindrical opening in said indented face by extruding the metal of the workpiece around the punch in a direction toward the open end of the die and opposite that of the movement of the punch, and then turning the workpiece end for end and, by the action of a second die and movable punch, extruding the metal rearwardly about the moving punch to form a deep opening in the other face of the workpiece, while internally supporting the wall of the previously formed opening over a pin in the die and leaving a web of material between the bottoms of said openings, and simultaneously indenting the central portion of the face of the web at the bottom of the first formed opening.

3. The method of making a hollow cylindrical metal article which comprises cutting a workpiece from a length of metal stock, forming a peripheral chamfer at one end of the workpiece and an indentation in said end within the chamfer, then, by the action of a cooperating fixed die and movable punch, applying pressure to both ends of the workpiece while the latter is wholly confined within a die to form a relatively deep cylindrical opening in said indented face by extruding the metal of the workpiece around the punch in a direction toward the open end of the die and opposite that of the movement of the punch, and then turning the workpiece end for end and, by the action of a second die and movable punch, again extruding the metal of the workpiece around a moving punch in a direction toward the die opening and opposite that of the movement of the punch to form a deep opening in the other face of the workpiece, while internally supporting the wall of the previously formed opening and leaving a web of material between the bottoms of said openings, and then while supporting the peripheral portion of the web, piercing an opening through the central portion thereof of less diameter than that of the web.

4. The method of making a hollow cylindrical metal article which comprises cutting a workpiece from a length of metal stock, forming a peripheral chamfer at one end of the workpiece and an indentation in said end within the chamfer, then, by the action of a cooperating fixed die and movable punch, applying pressure to both ends of the workpiece while the latter is wholly confined within a die to form a relatively deep cylindrical opening in said indented face by extruding the metal of the workpiece around the punch in a direction toward the open end of the die and opposite that of the movement of the punch, simultaneously indenting the other end of the blank and forming a chamfer about said indentation, and then turning the workpiece end for end and, by the action of a second die and movable punch, again extruding the metal of the workpiece around a moving punch in a direction toward the die opening and opposite that of the movement of the punch to form a deep opening in the other face of the workpiece, while internally supporting the wall of the previously formed opening and leaving a web of material between the bottoms of said openings while preserving the chamfers formed at both ends of the blank and simultaneously indenting the central portion of the face of the web at the bottom of the first formed opening.

5. The method of making a hollow cylindrical metal article which comprises cutting a workpiece from a length of metal stock, forming a peripheral chamfer at one end of the workpiece and an indentation in said end within the chamfer, then, by the action of a cooperating fixed die and movable punch, applying pressure to both ends of the workpiece while the latter is wholly confined within a die to form a relatively deep cylindrical opening in said indented face by extruding the metal of the workpiece around the punch in a direction toward the open end of the die and opposite that of the movement of the punch, then turning the workpiece end for end and, by the action of a second die and movable punch, forming a deep opening in the other face of the workpiece, while supporting the wall of the previously formed opening against deformation and leaving a web of material between the bottoms of said openings, and then supporting the workpiece in a die by engagement of the peripheral portion of said web at the bottom of one of said openings, and piercing a hole through said web while so supported of a diameter smaller than that of the opening.

6. The method of making a hollow cylindrical metal article which comprises cutting a workpiece from a length of metal stock, forming a peripheral chamfer at one end of the workpiece and an indentation in said end within the chamfer, then, by the action of a cooperating die and movable punch, applying pressure to both ends of the workpiece to form a relatively deep opening in said indented face by extruding the metal of the workpiece around the punch in a direction opposite that of the movement of the punch, then turning the workpiece end for end and, by the action of a second die and movable punch, forming a deep opening in the other face of the workpiece, leaving a web of material between the bottoms of said openings and simultaneously indenting the face of the web at the bottom of one of said openings, and then supporting the workpiece against movement in a die by pressure applied to the peripheral portion of said web at the bottom of one of said openings, and piercing an opening through the web while so supported.

References Cited in the file of this patent

UNITED STATES PATENTS

| | | |
|---|---|---|
| 2,057,527 | Johnson | Oct. 13, 1936 |
| 2,395,721 | Buchet | Feb. 26, 1946 |
| 2,542,023 | Friedman | Feb. 20, 1951 |
| 2,689,359 | Friedman | Sept. 21, 1954 |
| 2,748,464 | Kaul | June 5, 1956 |
| 2,756,444 | Schaeffer | July 31, 1956 |
| 2,871,492 | Sciullo | Feb. 3, 1959 |
| 2,980,993 | Lyon | Apr. 25, 1961 |